United States Patent
Sanford et al.

(10) Patent No.: US 8,687,299 B1
(45) Date of Patent: Apr. 1, 2014

(54) BAYONET ATTACHMENT MECHANISMS

(75) Inventors: Emery A. Sanford, San Francisco, CA (US); Dominic C. Toselli, Calgary (CA)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 13/607,611

(22) Filed: Sep. 7, 2012

(51) Int. Cl.
*G02B 7/02* (2006.01)

(52) U.S. Cl.
USPC .............. 359/828; 359/827; 362/365; 92/161

(58) Field of Classification Search
USPC .......... 359/611, 819, 823, 827, 828; 362/148, 362/365; 368/88, 281, 294; 285/312, 315, 285/316, 361; 251/149.1, 238, 325; 92/161
See application file for complete search history.

(56) References Cited

U.S. PATENT DOCUMENTS

| | | | |
|---|---|---|---|
| 2,315,981 A | 4/1943 | Olson | |
| 4,017,878 A | 4/1977 | Hagiwara | |
| 4,302,077 A | 11/1981 | Sato et al. | |
| 4,766,453 A | 8/1988 | Shiokama et al. | |
| 5,384,614 A | 1/1995 | Hasuda | |
| 5,644,441 A | 7/1997 | Hirasaki et al. | |
| 6,226,068 B1 * | 5/2001 | Arcykiewicz et al. | 439/314 |
| 6,371,630 B1 * | 4/2002 | Unger | 362/365 |
| 7,072,247 B2 * | 7/2006 | Hiranuma et al. | 368/88 |
| 7,082,870 B2 * | 8/2006 | Verbo et al. | 92/161 |
| 2013/0015656 A1 * | 1/2013 | Ehrke et al. | 285/316 |

* cited by examiner

*Primary Examiner* — Loha Ben
(74) *Attorney, Agent, or Firm* — Womble Carlyle Sandridge & Rice LLP

(57) ABSTRACT

An attachment mechanism includes a compliance member positioned between a body and bayonets. The bayonets collectively define an aperture therebetween. Alignment members prevent rotation of the bayonets relative to the body while allowing the bayonets to move radially outwardly against the compliance member. When a second attachment mechanism is received in the aperture of the first attachment mechanism, relative rotation therebetween may interlock corresponding bayonets thereof. The attachment mechanisms may release from one another in a drop event or other incidence of force applied thereto by allowing a bayonet to radially move outwardly out of contact with a corresponding bayonet of the second attachment mechanism. Related methods are also provided.

21 Claims, 17 Drawing Sheets

BAYONET ATTACHMENT MECHANISMS

TECHNICAL FIELD

The present disclosure relates generally to attachment mechanisms, and more particularly to attachment mechanisms configured to attach an accessory device to an electronic device.

BACKGROUND

Various methods and apparatuses have been developed for coupling accessory devices to other items. For example, eyelets, hook and loop fasteners, threaded fasteners, and other mechanisms have been developed for this purpose. Such mechanisms are employed in a wide variety of applications.

However, existing embodiments of mechanisms configured to couple accessory devices to devices such as electronic devices may prove unsatisfactory to a user. In this regard, existing embodiments of such mechanisms may detract from the aesthetic appeal of the device or alter the form factor of the device to a less desirable configuration. Further, some embodiments of attachment mechanisms may not be configured to release in a drop event, and accordingly, damage to one or both of the accessory device and the electronic device may result.

Accordingly, improved apparatuses and methods for attaching accessory devices may be desirable.

SUMMARY

Attachment mechanisms are provided. The attachment mechanisms may be configured to couple accessory devices, such as lens devices to an electronic device. For example, a lens may be coupled to the exterior of an electronic device with first and second attachment mechanisms.

A first attachment mechanism may include bayonets that collectively define and surround an aperture. The bayonets may be received in a body, and a compliance member such as an elastomeric ring may be positioned between the body and an outer wall defined by each of the bayonets. The compliance member may thus compress the bayonets into engagement with one another. Alignment members may prevent rotation of the bayonets relative to the body, while allowing radial movement of the bayonets.

A second attachment mechanism configured to couple to the first attachment mechanism may include stationary bayonets extending from a base. The aperture defined by the bayonets may be configured to receive the second attachment mechanism axially therethrough. Once the first and second attachment mechanisms are joined in this manner, they may be rotated relative to one another. The rotation may cause the bayonets of the second attachment mechanism to press against the bayonets of the first attachment mechanism. Accordingly, the bayonets of the first attachment mechanism may be displaced radially outwardly against the compliance member. As detents of the first attachment mechanism and the second attachment mechanism align, the attachment mechanisms may reach a secured configuration.

The attachment mechanisms may be released from the secured configuration by rotating the first attachment mechanism relative to the second attachment mechanism in the opposite direction. The attachment mechanisms may also be configured to release when force is applied to the devices coupled together by the attachment mechanisms. In this regard, a bayonet of the first attachment mechanism may travel up a ramp defined by a bayonet of the second attachment mechanism while being radially displaced outwardly against the compliance member. Thereby, the attachment mechanisms may separate such that force applied to a first device may not be fully transferred to the second device, and thereby the second device may be protected. Related methods are also provided.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed assemblies, methods, and systems. These drawings in no way limit any changes in form and detail that may be made to the disclosure by one skilled in the art without departing from the spirit and scope of the disclosure.

DETAILED DESCRIPTION

Example applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In this field of electronic devices, it may be desirable to attach an accessory device thereto. For example, it may be desirable to couple a lens device to a portable electronic device including a camera. In this regard, the camera may not include optical zoom functionality, wide angle capability, or certain filters, and hence the addition of an accessory device that includes one or more of these functionalities may be desirable. However, existing embodiments of lens accessory devices have employed unsatisfactory solutions, particularly in the context of lens accessory devices configured for exterior mounting.

In this regard, some lens accessory devices include a separate case that attaches to the electronic device, and the lens attaches to the case (e.g., via a threaded connection). The required use of a case may alter the form factor of the electronic device by increasing the size thereof, which may be undesirable to a consumer. Further, a consumer may prefer an electronic device with a built-in option for attaching a lens accessory device.

Another embodiment of a lens accessory device includes a magnetic ring that mounts around the camera on the housing of the electronic device and the lens magnetically couples thereto. However, magnetic coupling may be insufficient to retain the connection therebetween during activities such as walking or handling of the electronic device that may be expected during normal use. Further, the magnetic ring may be unsightly. Additionally, if the magnetic ring is improperly aligned with respect to the camera, the view through the lens may be obstructed or distorted.

Figure 1:
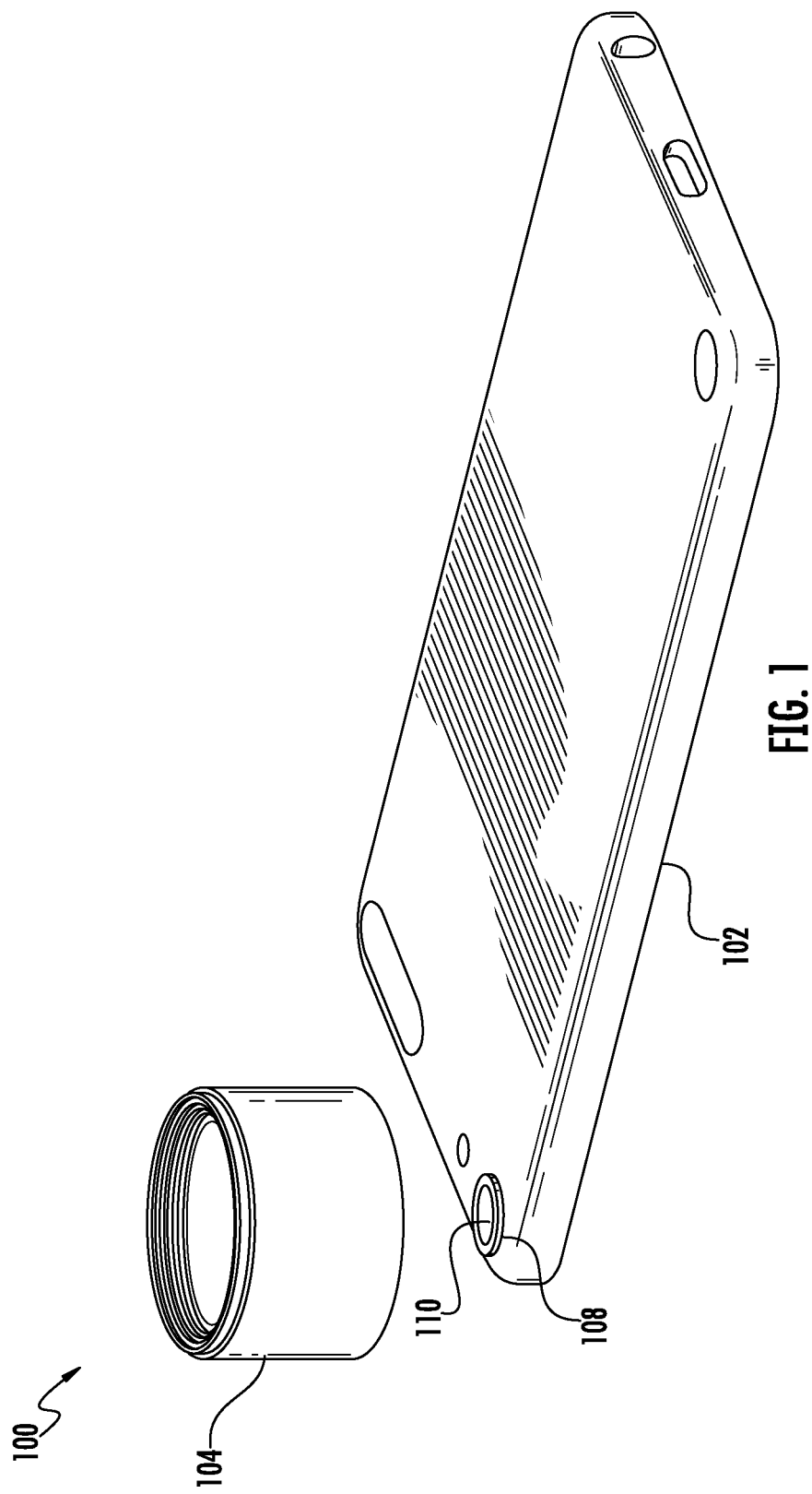
FIG. 1 illustrates a system comprising an electronic device and a lens device in a decoupled configuration according to an example embodiment of the present disclosure.
Figure 2:
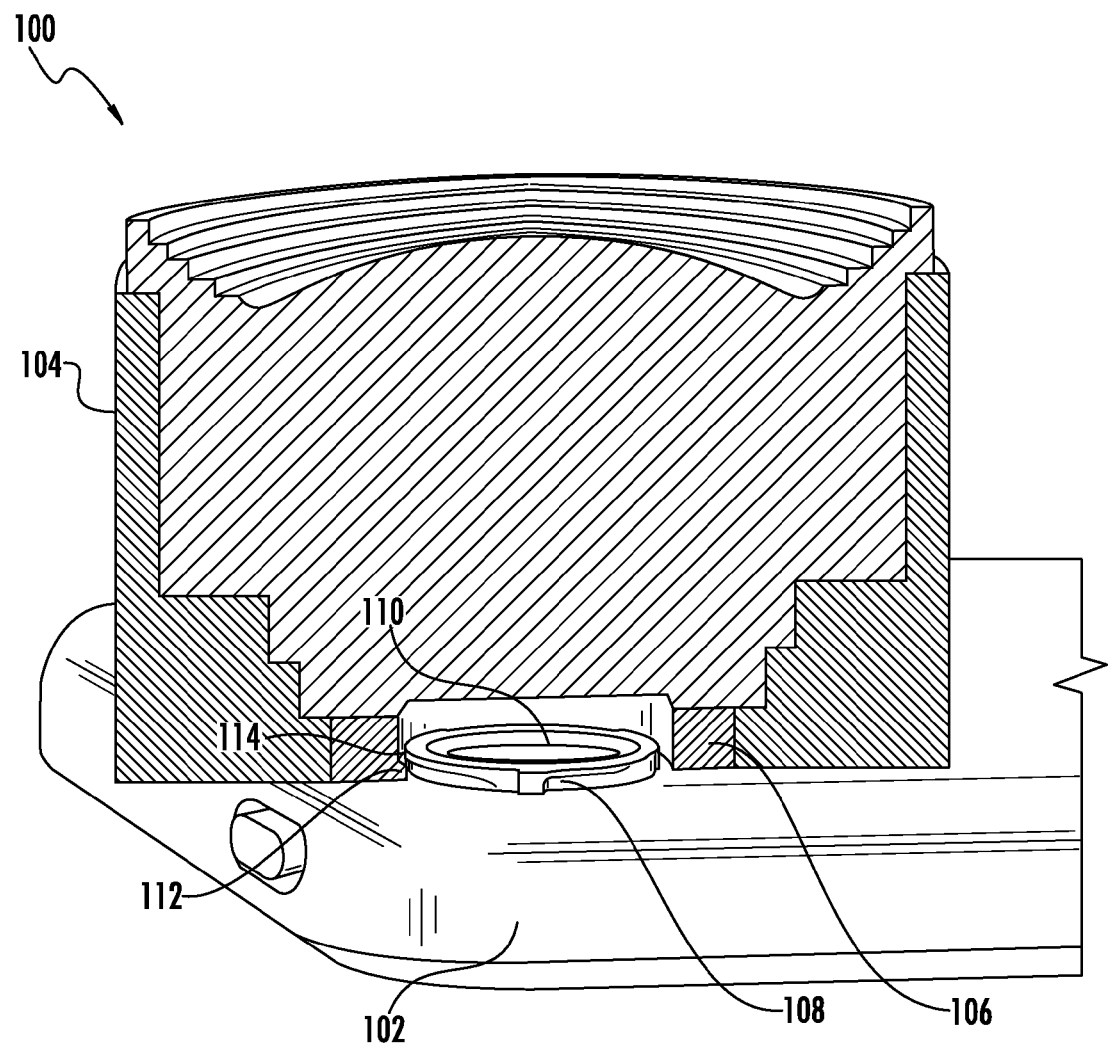
FIG. 2 illustrates the system of FIG. 1 in a coupled configuration.

Accordingly, an integrated solution for attaching an accessory device to an electronic device, for example such that the accessory device is mounted to an exterior of the electronic device, may be desirable. In this regard, FIG. 1 illustrates a system 100 comprising an electronic device 102 and an accessory device in the form of a lens device 104 configured to couple thereto. As illustrated in FIG. 2, the interaction between a first attachment mechanism 106 coupled to the lens device 104 and a second attachment mechanism 108 coupled to the electronic device 102 may provide for coupling therebetween. Specifically, the lens device 104 may couple to the electronic device 102 at a camera 110 thereof such that the electronic device may take advantage of added functionality provided by the lens device.

Figure 3:
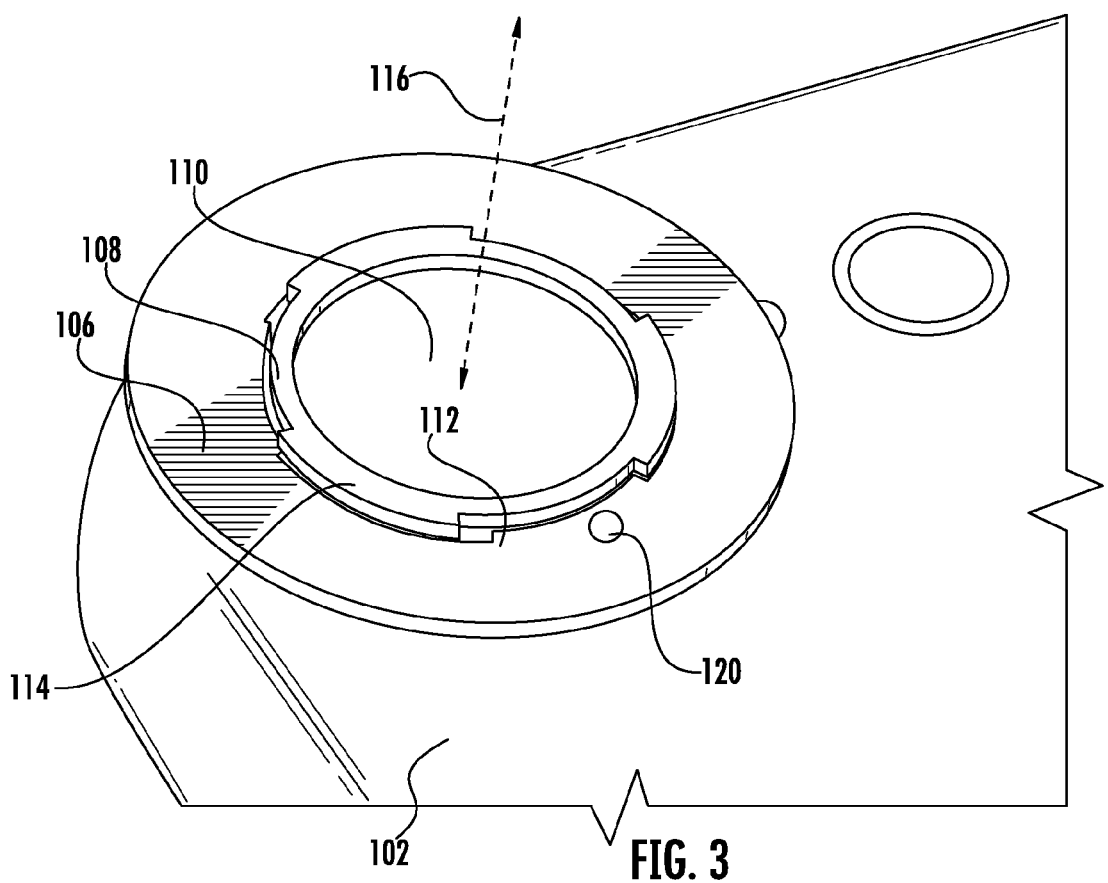
FIG. 3 illustrates first and second attachment mechanisms of the system of FIG. 1 in an unsecured configuration according to an embodiment of the present disclosure.
Figure 4:
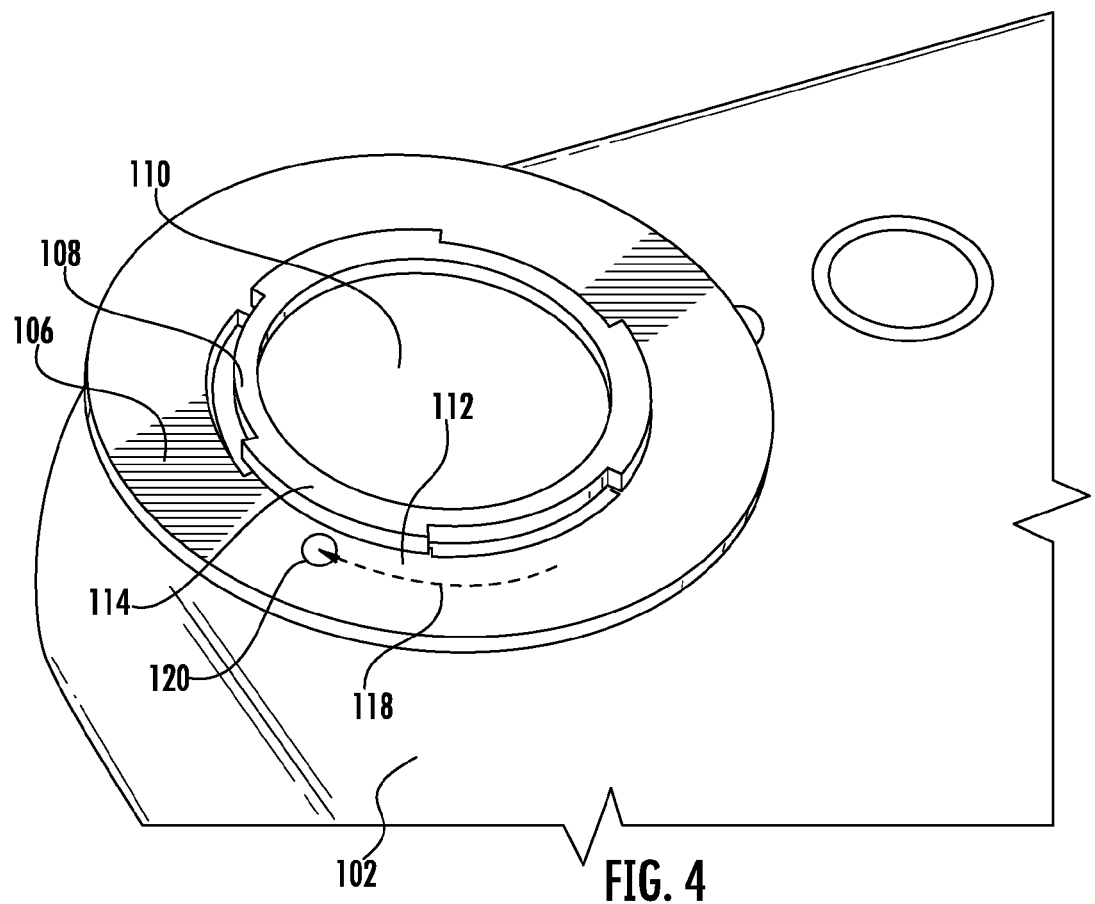
FIG. 4 illustrates the first and second attachment mechanisms of FIG. 3 in a secured configuration.

Although a variety of attachment mechanisms may be employed, in one embodiment the attachment mechanisms 106, 108 may respectively comprise first and second pluralities of bayonets 112, 114, as illustrated in FIGS. 3 and 4. For clarity purposes the first attachment mechanism 106 is shown without the lens device 104. FIG. 3 illustrates the attachment mechanisms 106, 108 in an unsecured configuration. In this regard, the attachment mechanisms 106, 108 may be moved toward one another along an axis 116 to reach the unsecured position. In the unsecured position, the bayonets 112 of the first attachment mechanism 106 are misaligned relative to the bayonets 114 of the second attachment mechanism 108. Accordingly, the second attachment mechanism 108 may be axially inserted into the first attachment mechanism 106.

Thereafter, as illustrated in FIG. 4, the attachment mechanisms 106, 108 may be rotated relative to one another (e.g., in the direction indicated by arrow 118) such that the bayonets 112, 114 overlap one another and are held in place via interference fit. A dot 120 is provided to illustrate the movement of the first attachment mechanism 106 from the unsecured configuration (see, FIG. 3) to a secured configuration (see, FIG. 4). The attachment mechanisms 106, 108 may be returned to the unsecured configuration by rotating the first attachment mechanism relative to the second attachment mechanism in the opposing direction (opposite to the arrow 118).

Accordingly, the lens device 104 may be secured to and unsecured from the electronic device 102 as described above. However, use of attachment mechanisms comprising typical bayonets may not be desirable. In this regard, typical bayonet mounts may be relatively strong and require relative rotation of the attachment mechanisms in order to release the two items held together thereby. While a strong connection is normally advantageous, in a drop event such a strong connection may be undesirable. In this regard, in the context of the system 100 described above, if the lens device 104 impacts the ground when the system is dropped, the lens device may transfer force to the electronic device 102 through the attachment mechanisms 106, 108. This force may be relatively strong depending on the height from which the system 100 is dropped. Accordingly, in some events the lens device 104 may transfer enough force that the second attachment mechanism 108 may cause damage to the electronic device. For example, a housing thereof may be bent or otherwise damaged. Accordingly, it may be desirable to configure the attachment mechanisms such that they release when force greater than a desired threshold is applied thereto. However, it may also be desirable that the attachment mechanisms maintain a secure connection in other circumstances.

Figure 5:
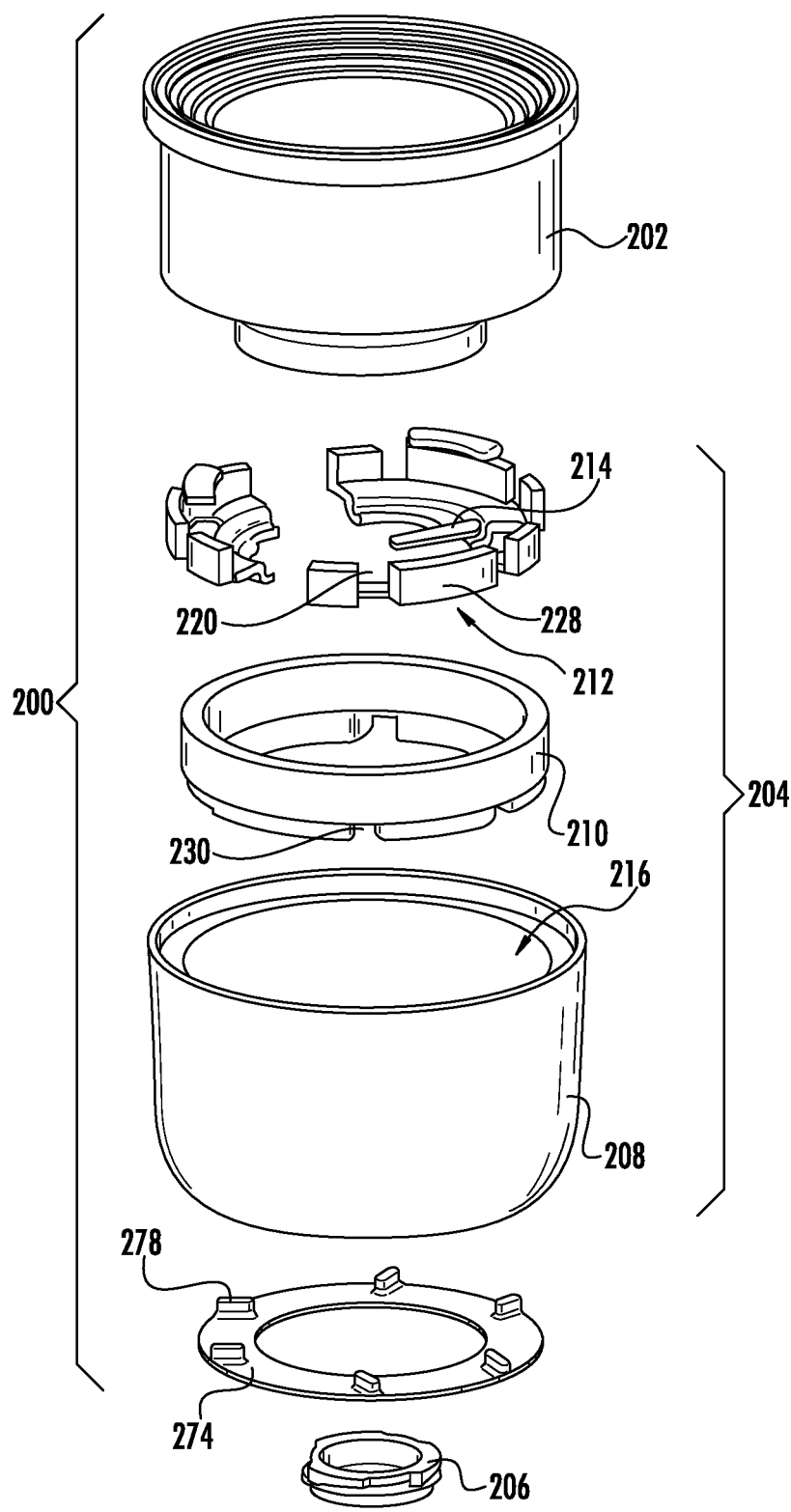
FIG. 5 illustrates an exploded view of a lens device and first and second attachment mechanisms, wherein the first attachment mechanism includes radially displaceable bayonets and a compliance member according to an example embodiment of the present disclosure.

Accordingly embodiments of the present disclosure relate to improved attachment mechanisms. In this regard, FIG. 5 illustrates an exploded view of an embodiment of a lens device 200 according to an example embodiment of the present disclosure. The lens device 200 may comprise a lens 202 and a first attachment mechanism 204 configured to engage a second attachment mechanism 206. The lens 202 may comprise a variety of different embodiments of lens (e.g., telescopic, wide angle, fish eye, filtered, etc.).

The first attachment mechanism 204 may comprise a body 208, a compliance member 210, a plurality of bayonets 212, and a plurality of sliding inserts 214. The body 208 defines a cavity 216 in which compliance member 210 and the bayonets 212 are received. In one embodiment the body 208 may comprise aluminum, the bayonets 212 may comprise stainless steel, the compliance member 210 may comprise silicone rubber, and the sliding inserts 214 may comprise Teflon, although various other materials may be employed in other embodiments.

Figure 6:
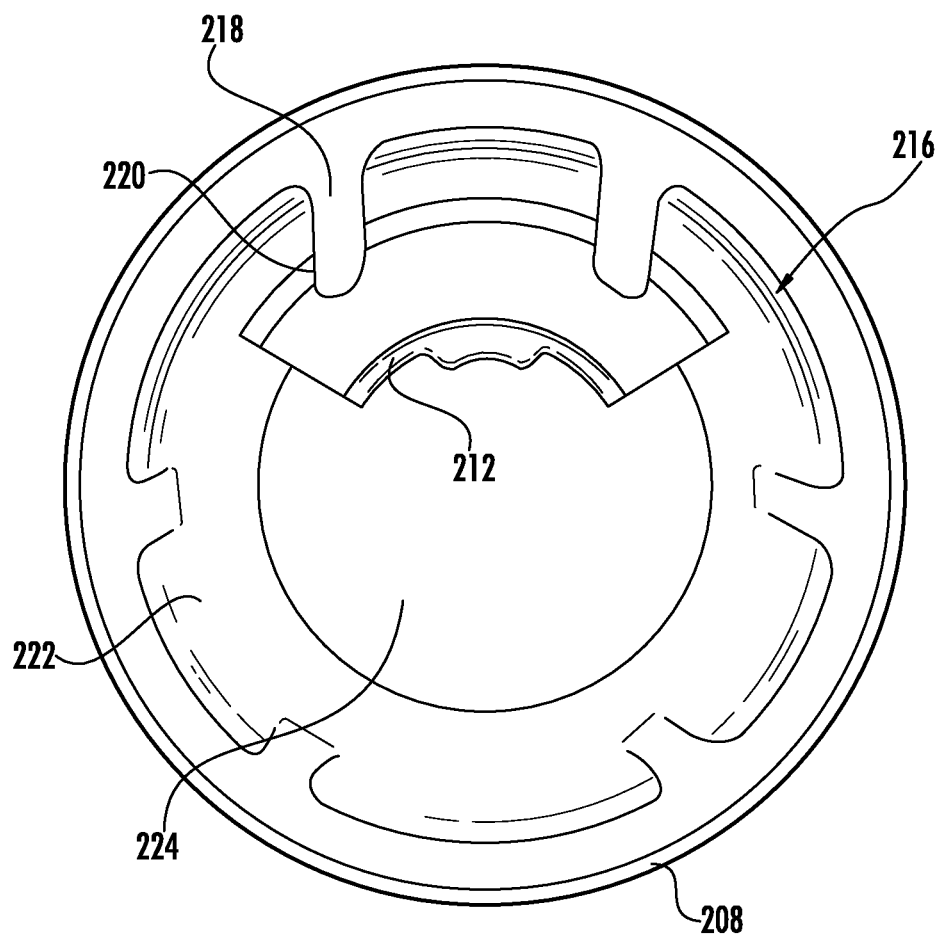
FIG. 6 illustrates an end view of a body and a bayonet of the first attachment mechanism of FIG. 5.

FIG. 6 illustrates an overhead view of the body 208 and one of the bayonets 212 received in a cavity 216 defined thereby. As illustrated, the first attachment mechanism 204 may further comprise a plurality of alignment members 218. In one embodiment the alignment members 218 may be defined by the body 208, whereas in another embodiment a separate insert may be provided that defines the alignment members.

The alignment members 218 may be configured to allow radial movement of the bayonets 212 and restrain rotational movement of the bayonets relative to the body 208. In this regard, the bayonets 212 may respectively comprise one or more recesses 220 and the alignment members 218 may extend through the recesses. Both the recesses 220 and the alignment members 218 may extend radially inwardly toward the center the cavity 216. The bayonets 212 may slide between the alignment members 218, which may comprise prongs, and an end wall 222 of the body 208. A through hole 224 may be defined in the end wall 222 of the body 208.

Figure 7:
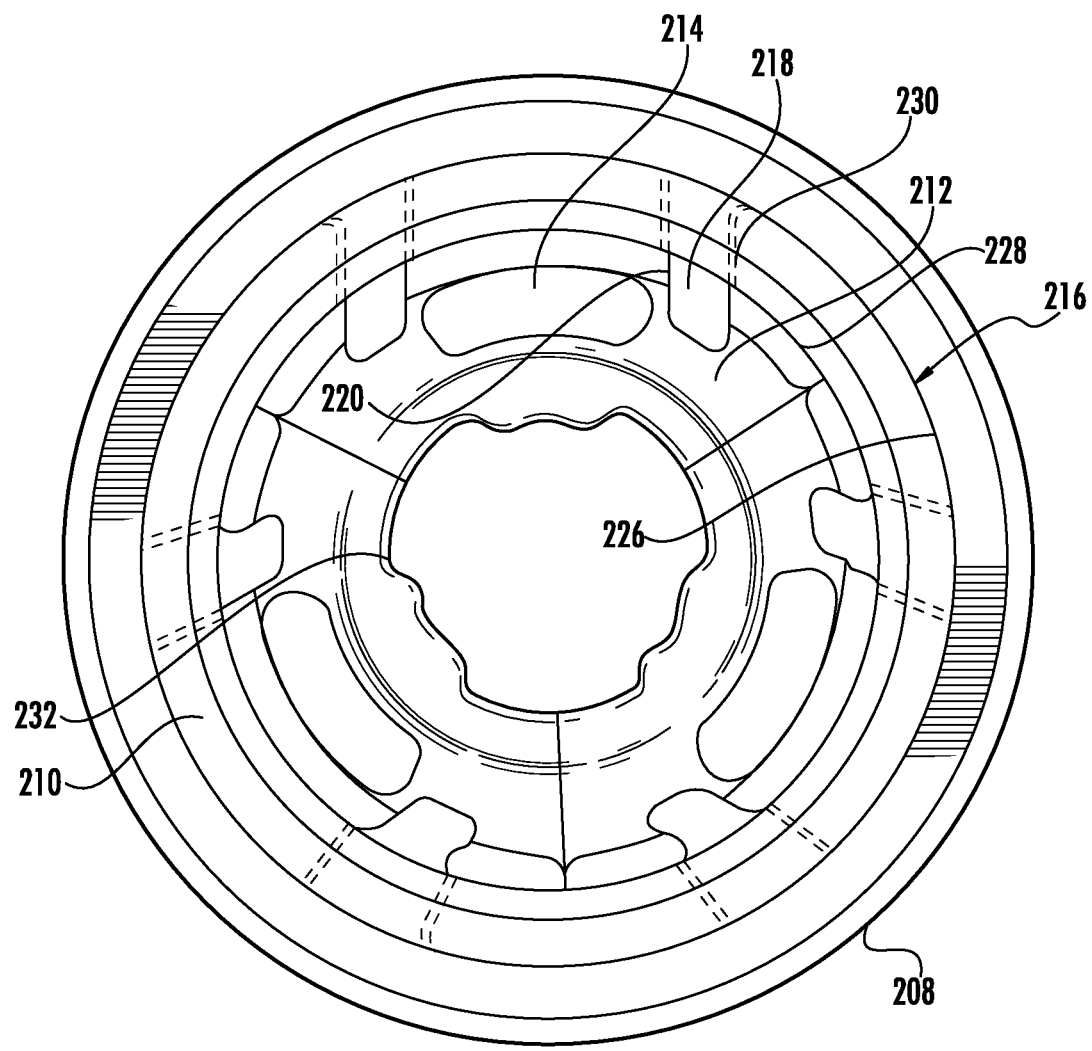
FIG. 7 illustrates an end view of the first attachment mechanism of FIG. 5.

Note that the compliance member 210 may be positioned between the bayonets 212 and the body 208. In this regard, as illustrated in FIG. 7, the compliance member 210 may be configured to bias the bayonets 212 toward one another. For example, the compliance member 210 may comprise an elastomeric ring that is placed into contact with a cylindrical inner surface 226 of the body 208 and an outer wall 228 (see, e.g., FIG. 5) of the bayonets 212. In one embodiment the compliance member 210 may be partially compressed by the bayonets 212 when the first attachment mechanism is configured in an unsecured configuration, such that the bayonets 212 are retained in place without gaps therebetween in an unsecured configuration. The compliance member 210 may define a plurality of recesses 230 through which the alignment members 218 may extend in order to also extend through the recesses 220 in the bayonets 212 as described above.

As illustrated in FIG. 7, the bayonets 212 may be received in the cavity 216 defined by the body 208 such that the bayonets are radially disposed around an aperture 232 defined by the bayonets. The aperture 232 may align with the through hole 224 defined in the end wall 222 of the body 208. Accordingly, the first attachment mechanism 204 may mate with the second attachment mechanism 206.

Figure 8:
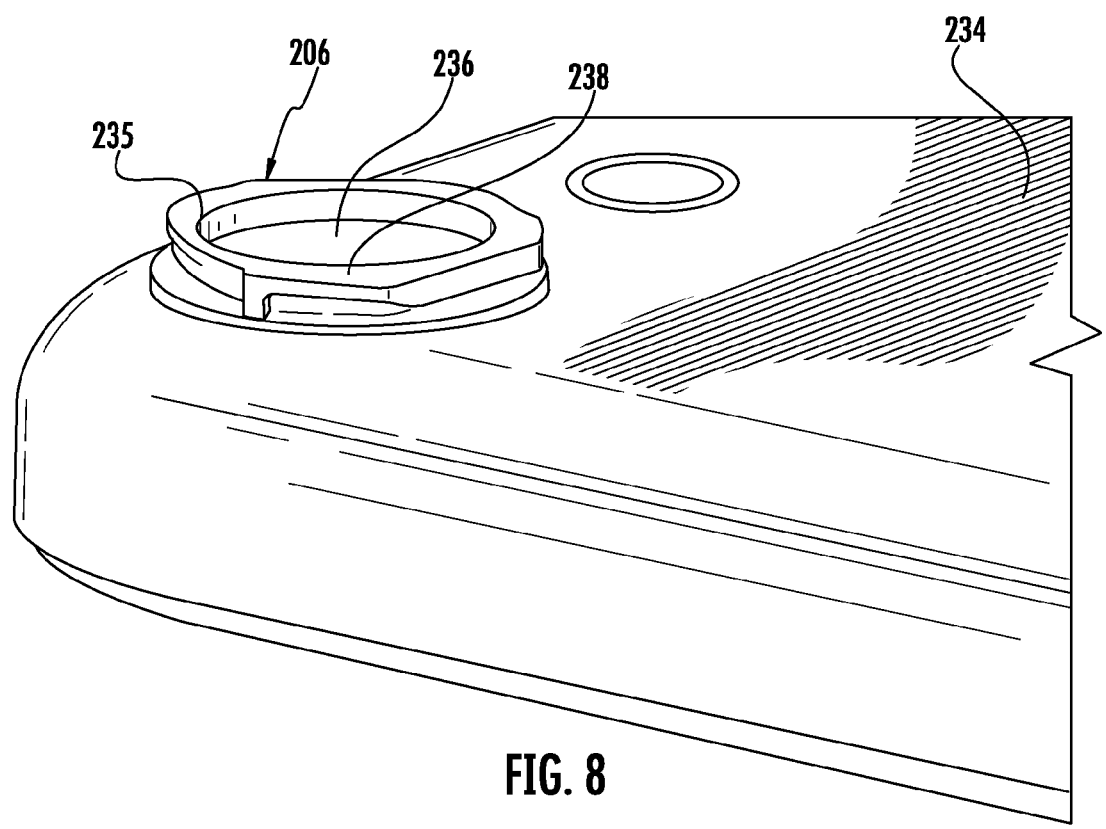
FIG. 8 illustrates a perspective view of the second attachment mechanism of FIG. 5 fixed to an electronic device according to an example embodiment of the present disclosure.

As illustrated in FIG. 8, the second attachment mechanism 206 may be coupled to an electronic device 234 such that the lens device 200 and/or other accessory devices may be coupled thereto. Note that although the first attachment mechanism 204 is generally described herein as being coupled to an accessory device and the second attachment mechanism 206 is generally described herein as being coupled to an electronic device, the opposite configuration may be provided in other embodiments.

As illustrated, the second attachment mechanism 206 may comprise a cylindrical base, which may include a hole 235 extending therethrough. The hole 235 may align with a camera 236 of the electronic device 234 in some embodiments. The second attachment mechanism 206 may also include a plurality of bayonets 238 extending therefrom. The bayonets 238 and/or the remainder of the second attachment mechanism 206 may comprise stainless steel in one embodiment, although various other materials may be employed in other embodiments.

Figure 9:
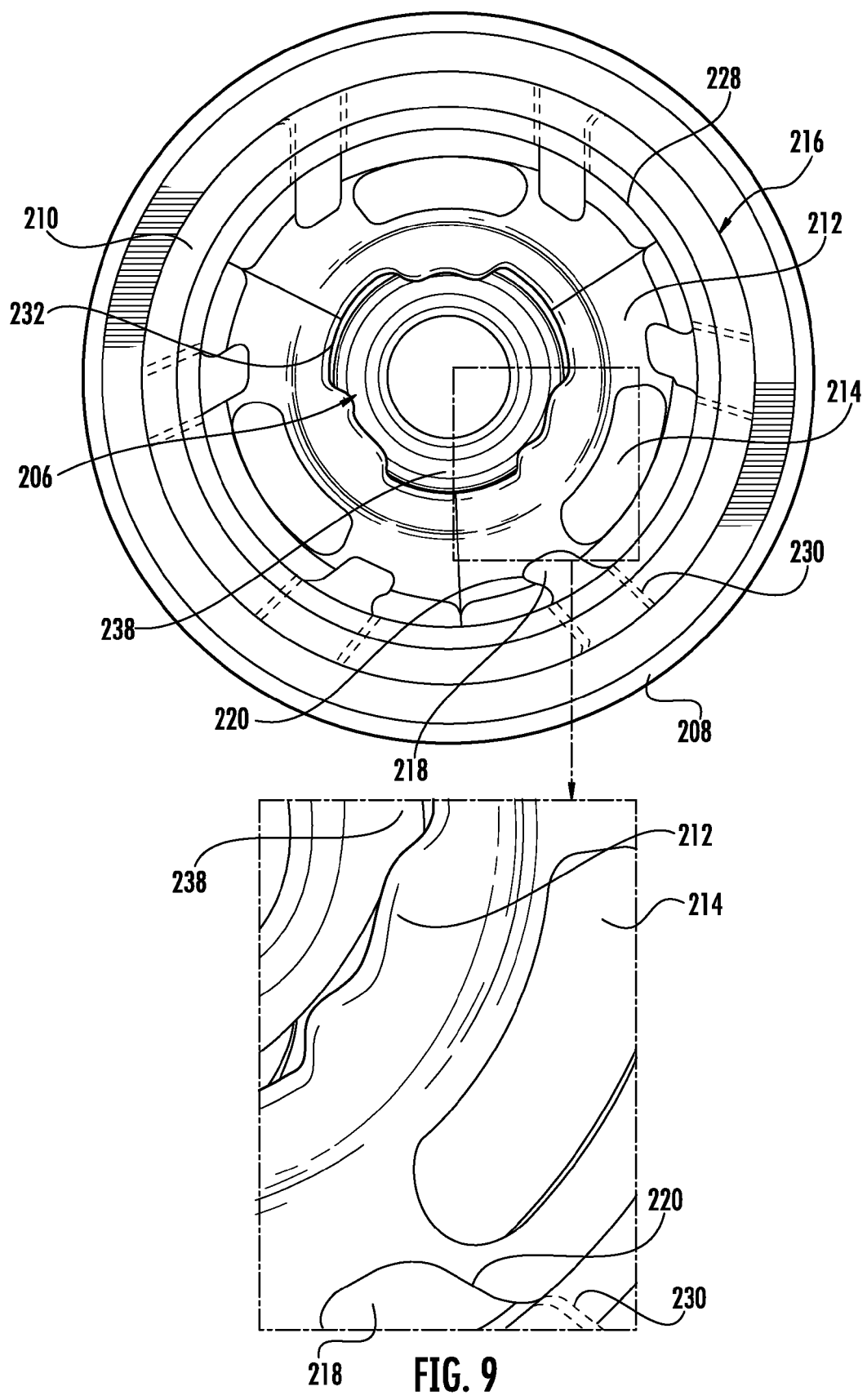
FIG. 9 illustrates an end view of first attachment mechanism and the second attachment mechanism of FIG. 5 in an unsecured configuration.

FIG. 9 illustrates the second attachment mechanism 206 received in the first attachment mechanism 204. More particularly, the first attachment mechanism 204 and the second attachment mechanism 206 are in an unsecured configuration. As illustrated, the aperture 232 defined by the bayonets 212 may correspond in shape to the outer profile of the second attachment mechanism 206 such that the second attachment mechanism may be received therethrough. Further, the aperture 232 may be sized such that the second attachment mechanism 206 may extend therethrough without requiring the bayonets 212 of the first attachment mechanism 204 to separate. Alternative, the bayonets 212 may separate slightly when the second attachment mechanism 206 is received in the first attachment mechanism 204 in another embodiment.

Figure 10:
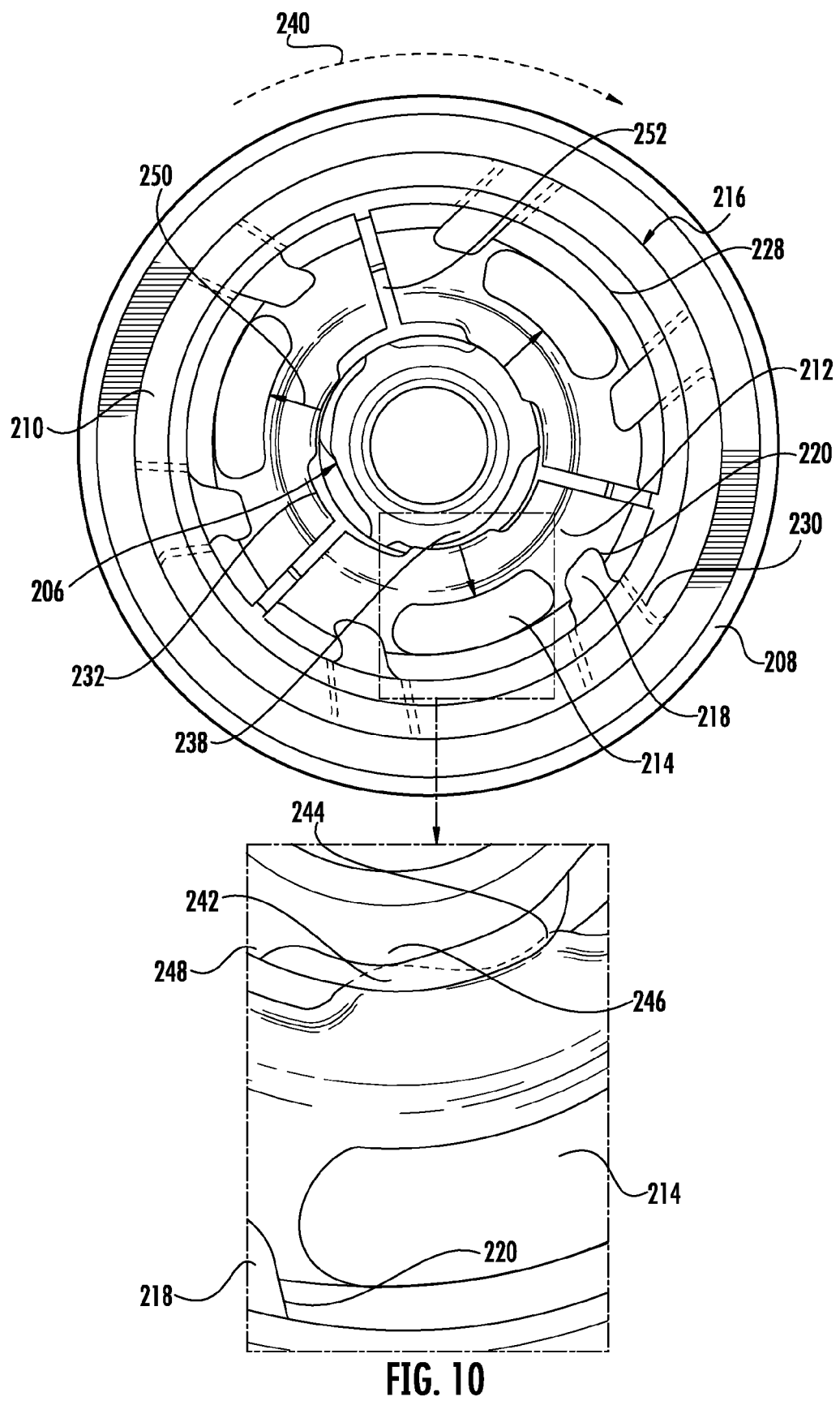
FIG. 10 illustrates an end view of first attachment mechanism and the second attachment mechanism of FIG. 5 in an intermediate configuration.

FIG. 10 illustrates the interaction between the first attachment mechanism 204 and the second attachment mechanism 206 as the first attachment mechanism is rotated in a clockwise direction 240 relative to the second attachment mechanism. As illustrated in FIG. 10, in one embodiment the bayonets 212 of the first attachment mechanism 204 may each define first and second detents 242, 244. The bayonets 238 of the second attachment mechanism 206 may each define a detent 246 and a stop member 248.

In this regard, as the first attachment mechanism 204 rotates in the clockwise direction 240 from the unsecured position illustrated in FIG. 9 to an intermediate position illustrated in FIG. 10, the first detent 242 of the bayonets 212 of the first attachment mechanism comes into contact with the detent 246 of the bayonets 238 of the second attachment mechanism 206. The contact between the detents 242, 246 causes an increase in the torque required for relative rotation between the first attachment mechanism 204 and the second attachment mechanism 206 that may be perceptible to a user. In this regard, the alignment members 218 may restrain rotational movement of the bayonets 212 of the first attachment mechanism relative to the remainder of the first attachment mechanism, as described above. Thus, interference between the first detent 242 of the bayonets 212 of the first attachment mechanism 204 and the detent 246 of the bayonets 238 of the second attachment mechanism 206 may require an increase in torque to continue the relative rotation therebetween.

During contact between the detents 242, 246, the bayonets 212 of the first attachment mechanism 204 may be radially displaced outwardly as indicated by the arrows 250, which may cause gaps 252 to be formed between the bayonets 212. The outward radial movement of the bayonets 212 of the first attachment mechanism 204 may be resisted by contact between the bayonets and the compliance member 210. Thus, the spring rate of the compliance member 210 may affect the torque required to rotate the first attachment mechanism 204 relative to the second attachment mechanism 206 to the intermediate position. In this regard, a relatively stiffer compliance member 210 may require more torque, whereas a relatively less stiff compliance member may require less torque.

Figure 11:
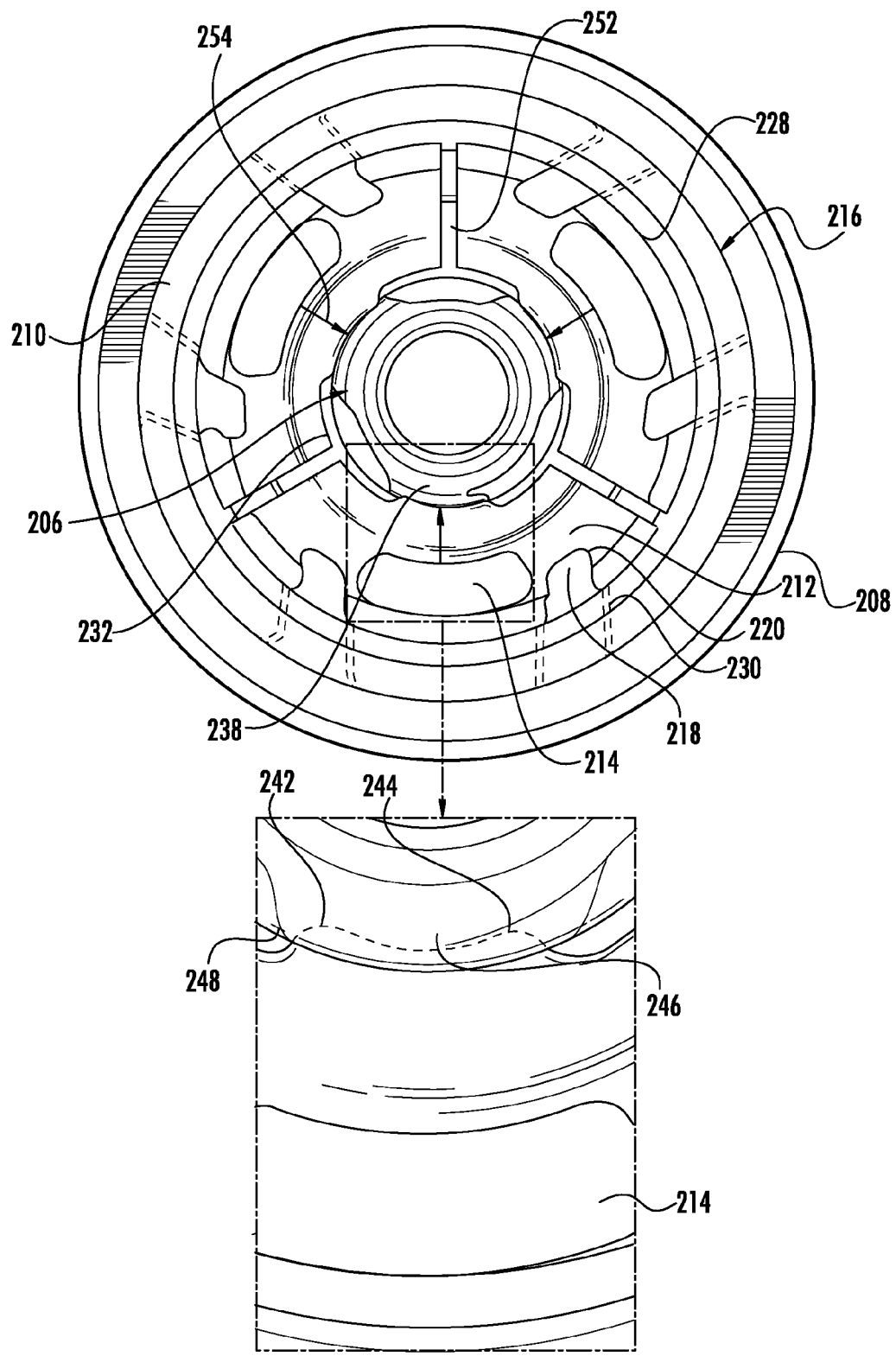
FIG. 11 illustrates an end view of first attachment mechanism and the second attachment mechanism of FIG. 5 in a secured configuration.

As the user continues to rotate the first attachment mechanism 204 in the clockwise direction 240 relative to the second attachment mechanism 206, the first attachment mechanism and the second attachment mechanism reach a secured configuration illustrated in FIG. 11. During this rotation, the first detent 242 of the bayonets 212 of the first attachment mechanism 204 passes the detent 246 of the bayonets 238 of the second attachment mechanism 206. Accordingly, the force associated with rotating the first attachment mechanism 204 relative to the second attachment mechanism decreases, and the plates move radially inwardly as indicated by the arrows 254 such that the size of the gaps 252 may decrease.

The detent 246 of the bayonets 238 of the second attachment mechanism 206 is then received between the first and second detents 242, 244 of the bayonets 212 of the first attachment mechanism 204, as illustrated in FIG. 11. In this configuration, the first detent 242 of the bayonets 212 of the first attachment mechanism 204 may be in contact with the detent 246 of the bayonets 238 of the second attachment mechanism 206 such that relative rotation of the first attachment mechanism in the a counterclockwise direction (opposite to the clockwise direction 240) is resisted. Further, the second detent 244 of the bayonets 212 of the first attachment mechanism 204 may be in contact with the detent 246 of the bayonets 238 of the second attachment mechanism 206 such that relative rotation of the first attachment mechanism in the clockwise direction 240 is resisted. Additionally, since the bayonets 212 of the first attachment mechanism 204 may overlap with the bayonets 238 of the second attachment mechanism 206, relative axial translation of the first attachment mechanism and the second attachment mechanism may be avoided. Accordingly, the first attachment mechanism 204 and the second attachment mechanism 206 may be secured to one another.

Additionally, in the secured configuration illustrated in FIG. 11, the stop member 248 of the bayonets 238 of the second attachment mechanism 206 may contact the first detent 242 of the bayonets 212 of the first attachment mechanism 204. The stop member 248 may extend radially outwardly from the bayonets 238 of the second attachment mechanism 206 farther than the detent 246. As a result of extending farther radially outwardly from the bayonets 238, the stop member 248 may cause the torque required to rotate the first attachment mechanism 204 relative to the second attachment mechanism 206 in the clockwise direction 240 to increase beyond the torque required to rotate the first detent 242 of the bayonets 212 of the first attachment mechanism past the detent 246 of the bayonets 238 of the second attachment mechanism. In this regard, the stop member 248 may be configured to provide the user with an indication that the attachment mechanisms 204, 206 have reached the secured configuration, and hence the attachment mechanisms should not be rotated further. However, should the user continue to rotate the first attachment mechanism 204 further in the clockwise direction 240 relative to the second attachment mechanism 206, the first attachment mechanism and the second attachment mechanism may return to the unsecured configuration illustrated in FIG. 9.

The attachment mechanisms 204, 206 may also be returned to the unsecured configuration by relative rotation in the opposite direction (opposite to the clockwise direction 240), with the interaction of the attachment mechanisms being substantially opposite to that described above during movement from the unsecured configuration to the secured configuration. Rotation in this manner may be the preferred method for returning the attachment mechanisms 204, 206 to the unsecured configuration in some embodiments. More particularly, as the first attachment mechanism 204 is rotated in a counterclockwise direction relative to the second attachment mechanism 204, the first detent 242 of the bayonets 212 of the first attachment mechanism may contact the detent 246 of the bayonets 238 of the second attachment mechanism, causing the bayonets 212 of the first attachment mechanism to move radially outwardly (see, e.g., arrows 250), opening the gaps 252 therebetween. Resistance associated with compression of the compliance member 210 may require an increase in torque to rotate the first attachment mechanism 204 relative to the second attachment mechanism 206, which may be perceptible to a user.

As the user continues to rotate the first attachment mechanism 204 in the counterclockwise direction relative to the second attachment mechanism 206, the first attachment mechanism and the second attachment mechanism return to the unsecured secured configuration illustrated in FIG. 9. During this rotation, the first detent 242 of the bayonets 212 of the first attachment mechanism 204 passes the detent 246 of the bayonets 238 of the second attachment mechanism 206. Accordingly, the force associated with rotating the first attachment mechanism 204 relative to the second attachment mechanism decreases, and the bayonets 212 of the first attachment mechanism 204 move radially inwardly (see, e.g., arrows 254) such that the size of the gaps 252 may decrease. Then the first attachment mechanism 204 and the second attachment mechanism 206 may be separated from one another by axial displacement of the first attachment mechanism relative to the second attachment mechanism in a direction opposite to the axial displacement direction employed to bring the attachment mechanisms into contact.

Note that engagement and disengage of the attachment mechanisms may occur in opposing directions in other embodiments. For example, engagement may occur via relative counterclockwise rotation between the attachment mechanisms in other embodiments. Further, disengagement may occur via relative clockwise rotation between the attachment mechanisms.

Figure 12:
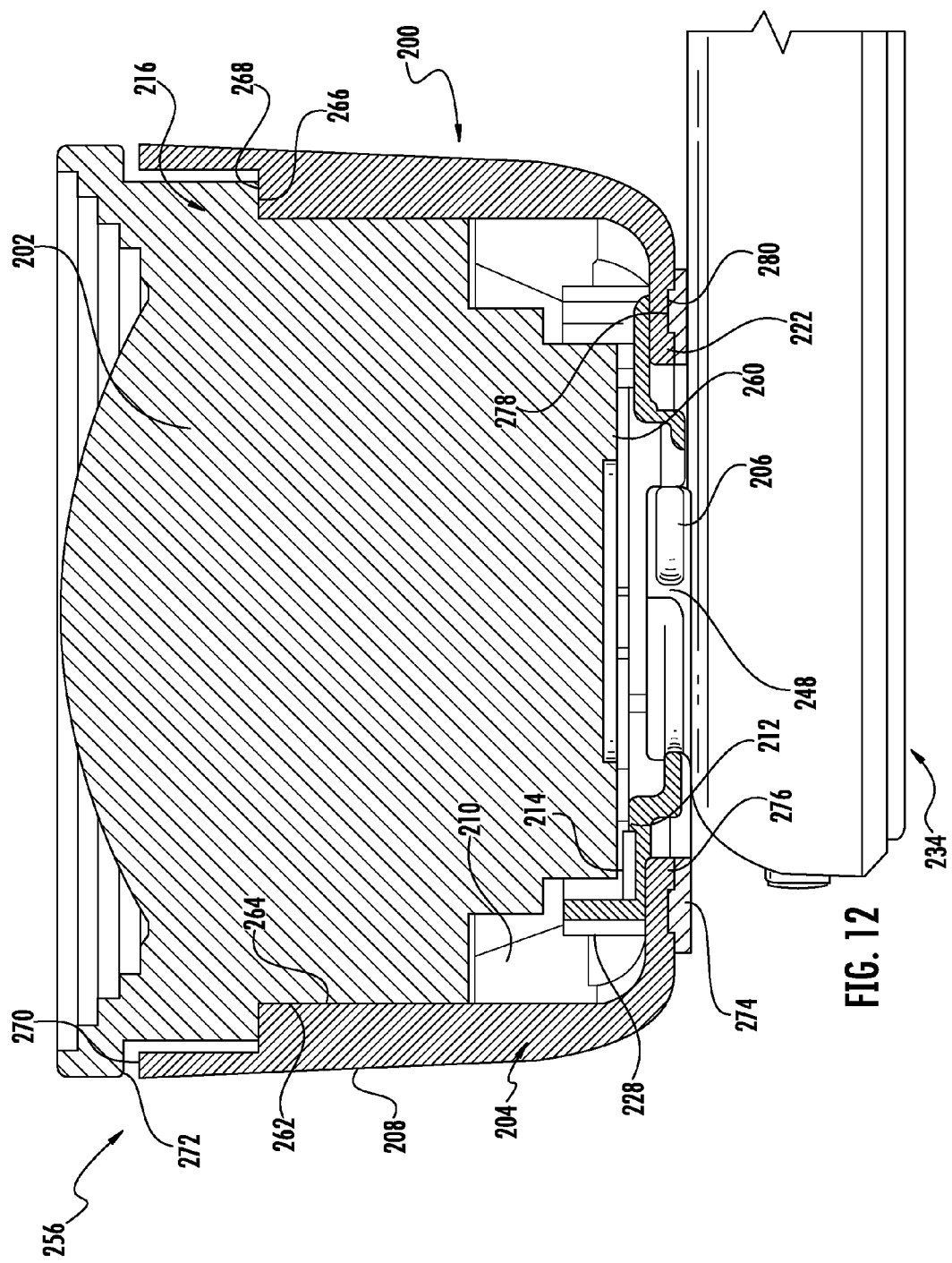
FIG. 12 illustrates a modified sectional view through a system comprising the lens device of FIG. 5 when coupled to the electronic device of FIG. 8 according to an example embodiment of the present disclosure.

The attachment mechanisms described herein may be employed in conjunction with a variety of devices. However FIG. 12 illustrates one example embodiment of a system 256 including the lens device 200 releasably coupled to the electronic device 234, which may comprise a camera 236 as described above. As illustrated, when the lens device 200 is assembled, the sliding inserts 214 may come into contact with a bottom surface 260 of the lens 202. For example, the lens 202 may define an external threaded surface 262 that may engage an internal threaded surface 264 of the body 208. Accordingly, the lens 202 may be secured to the body 208 by screwing therein.

Thereby, lens 202 may be received in the cavity 216 such that the bayonets 212 of the first attachment mechanism 204 are sandwiched between the lens and the end wall 222 of the body 208. Thus, the sliding inserts 214 may be positioned between the lens 202 and the bayonets 212 of the first attachment mechanism 204. Accordingly, the sliding inserts 214, which may comprise a material configured to reduce friction such as Teflon, may allow the bayonets 212 of the first attachment mechanism 204 to move as described above. Note that contact between the lens 202 and the sliding inserts 214 and between the end wall 222 of the body 208 and the bayonets 212 of the first attachment mechanism 204 may function to retain the bayonets 212 in place in a direction perpendicular to the radial movements described above.

The extent to which the lens 202 extends into the cavity 216 defined by the body 208 may be controlled by contact between a shoulder 266 of the lens and a shoulder 268 of the body, which may respectively extend around outer and inner perimeters thereof. Alternatively, or additionally, an outer end 270 of the body 208 may contact an outer shoulder 272 defined by the lens 202. Regardless, contact between the lens 202 and the body 208 may be employed to carefully define the extent to which the lens extends into the cavity 216. Thereby, the clearance between the lens 202 and the end wall 222 of the body 208, in which the bayonets 212 and the sliding inserts 214 of the first attachment mechanism are received, may be controlled such that the position of the bayonets may be controlled without introducing unnecessary friction resisting movement thereof.

As further illustrated in FIG. 12, the lens device 200 may also include a sliding ring 274 coupled to an outer surface 276 of the end wall 222 of the body 208. More particularly, the sliding ring 274 may include protrusions 278 that engage apertures 280 in the end wall 222 of the body 208. The sliding ring 274 may comprise a material such as Teflon configured to reduce friction such that during attachment of the lens device 200 to the electronic device 234, the sliding ring may prevent the body 208 of the lens device from scratching the electronic device. Further, the sliding ring 274 may be compressed during coupling between the attachment mechanisms 204, 206 such that the lens device 200 is retained in place.

Figure 13:
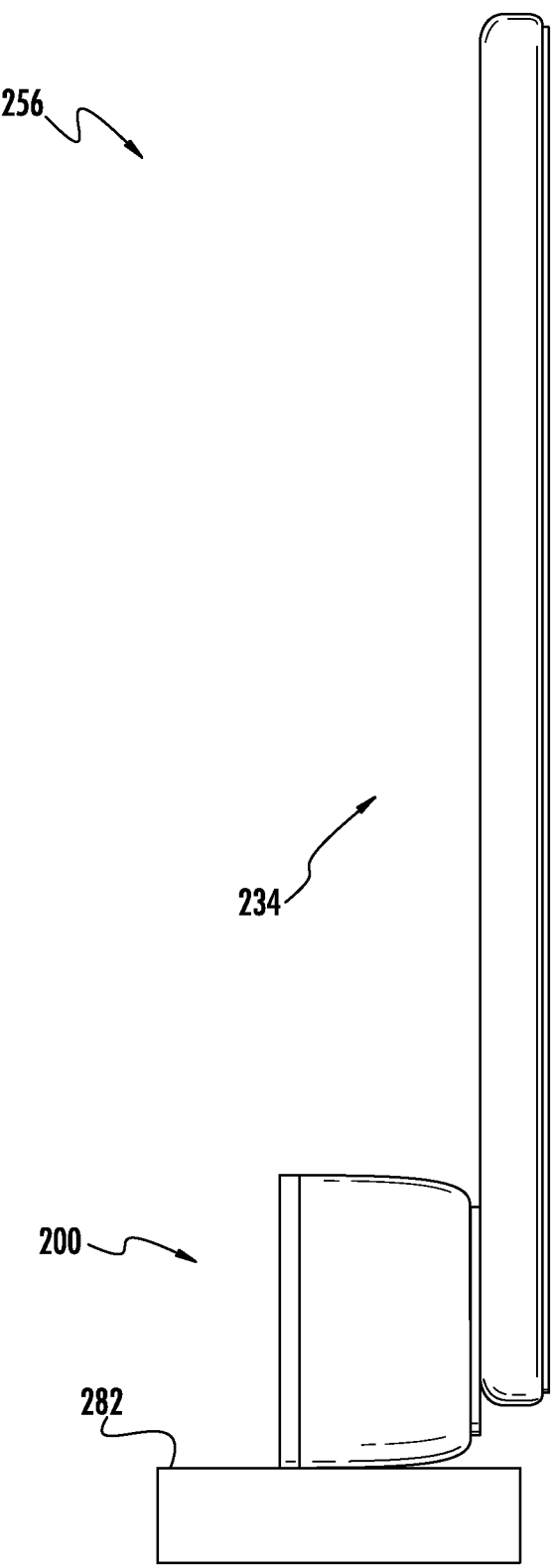
FIG. 13 illustrates a side view of the system of FIG. 12 during a drop event according to an example embodiment of the present disclosure.
Figure 14:
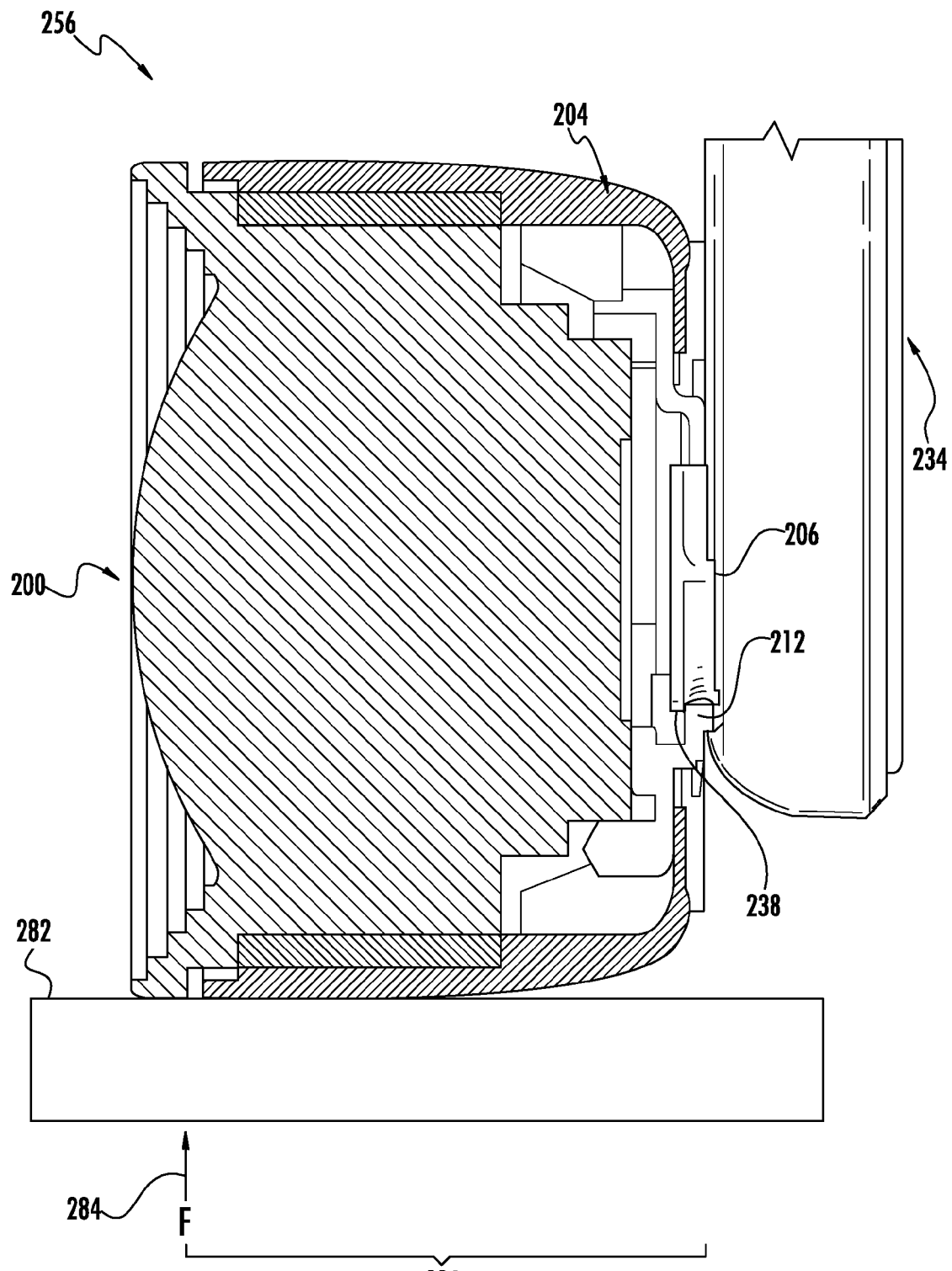
FIG. 14 illustrates a modified sectional view through the system of FIG. 12 at an initial impact during the drop event of FIG. 13.

As noted above, accessory devices may transmit forces to the devices they are coupled to during a drop event. In this regard, FIG. 13 illustrates a drop event in which the system 256 is dropped such that the lens device 200 impacts a surface 282. During the drop even the first attachment mechanism 204 and the second attachment mechanism 206 may initially be in the secured configuration, as illustrated in FIG. 14. However, the drop event may result in a force 284 being applied to the system 256 at a distance 286 from the electronic device 234.

Figure 15:
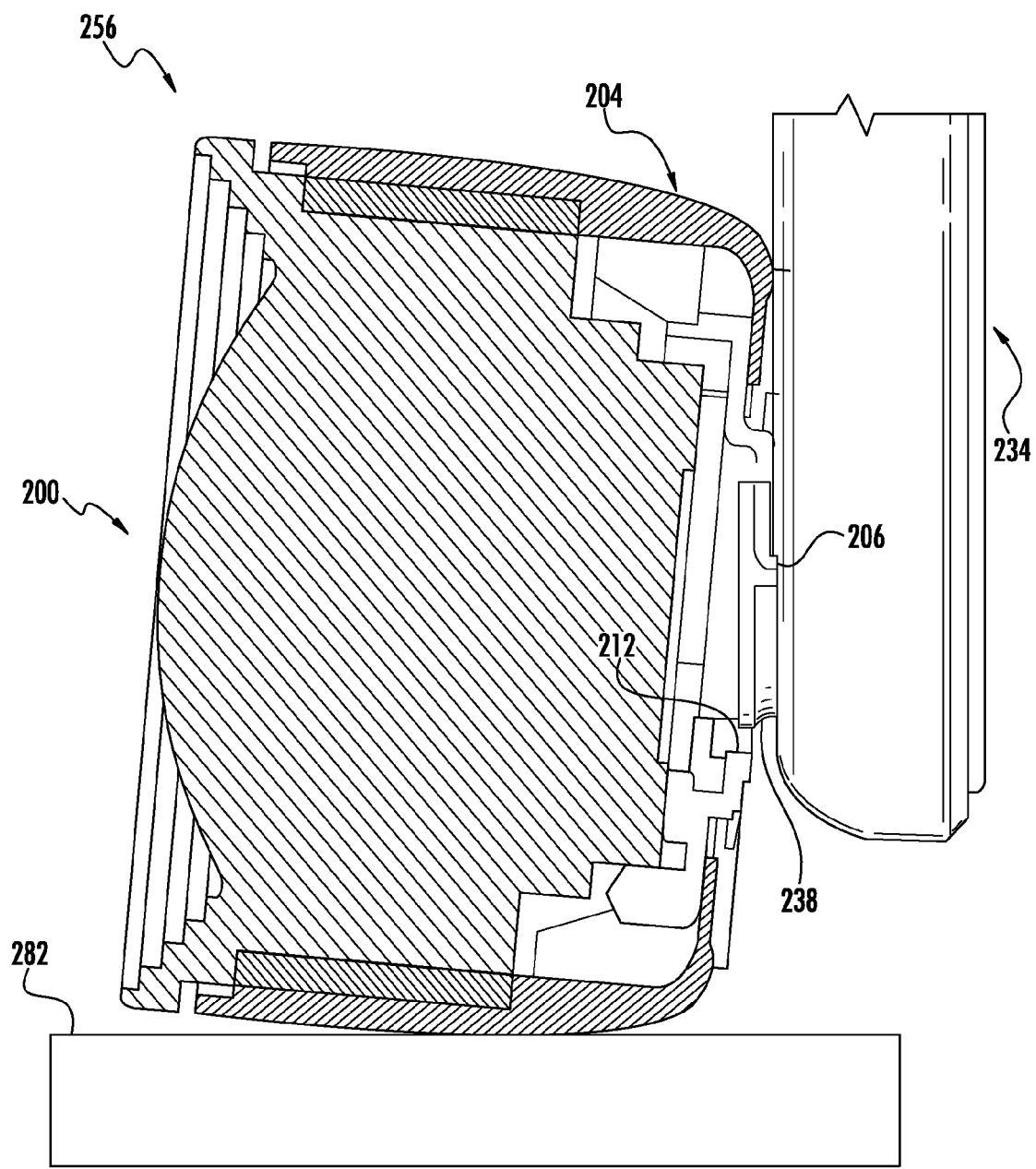
FIG. 15 illustrates a modified sectional view through the system of FIG. 12 as the lens device releases from the electronic device during the drop event of FIG. 13.

Accordingly, as illustrated in FIG. 15, the lens device 200 may release from the electronic device 234. In this regard, one of the bayonets 212 of the first attachment mechanism 204 may move radially outwardly and travel along a ramped surface 288 (see, FIG. 16) of one of the bayonets 238 of the second attachment mechanism 206 as a result of the force 284. Thus, the bayonets 212, 238 of the first and second attachment mechanisms 204, 206 may separate, and thereby, the attachment mechanisms may release from one another such that the lens device 200 and the electronic device 234 decouple. Thereby, the torque applied to the electronic device 234 through the lens device 200 may be reduced such that the possibility of damage to the electronic device may be reduced.

Figure 16:
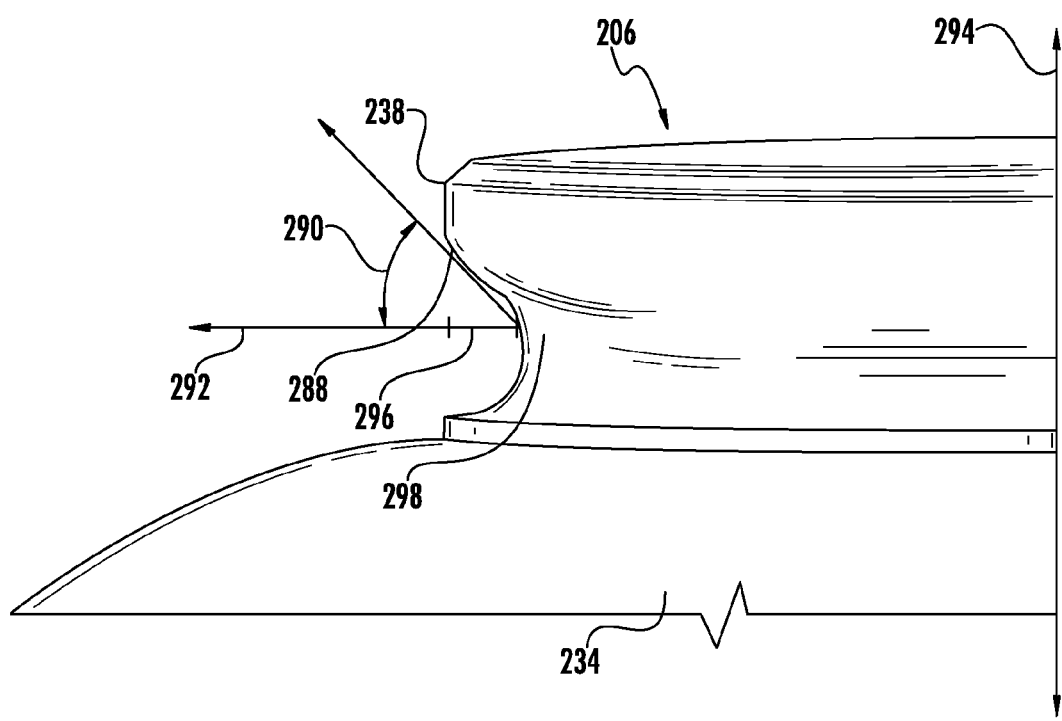
FIG. 16 illustrates an enlarged partial side view of the second attachment mechanism of FIG. 5 according to an example embodiment of the present disclosure.
Figure 17:
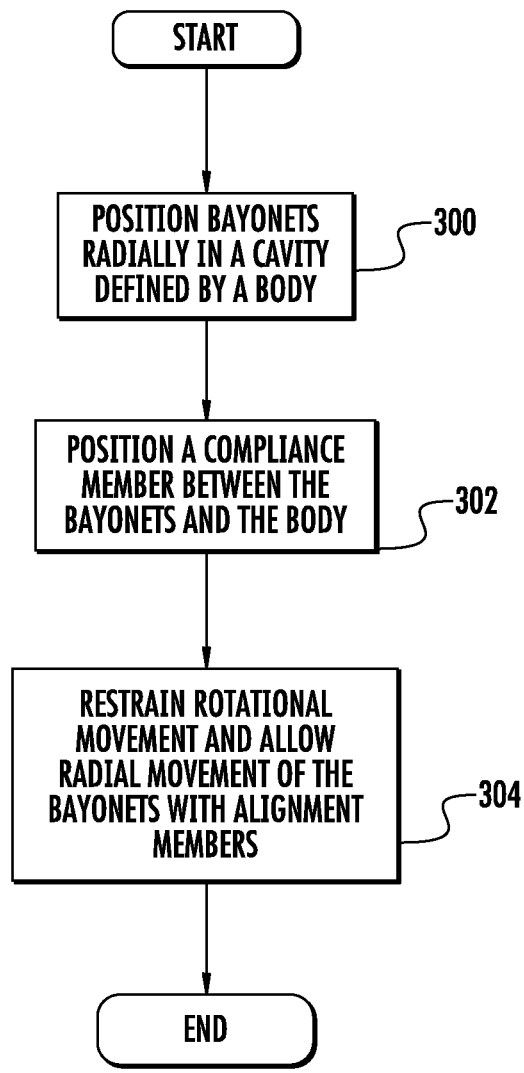
FIG. 17 illustrates a schematic diagram of a method according to an example embodiment of the present disclosure.

The force required to cause the attachment mechanisms 204, 206 to release without relative rotation therebetween may be adjustable. In this regard, as illustrated in FIG. 16, a ramp angle 290 defined by the ramp surface 288 of the bayonets 238 of the second attachment mechanism 206 may be adjusted. When the ramp angle 290 is defined relative to a direction 292 that is perpendicular to an axis 294 along which the attachment mechanisms 204, 206 are initially joined, a larger ramp angle will decrease the force the required to release the attachment mechanisms without rotation, whereas a smaller ramp angle will increase the force required to release the attachment mechanisms without rotation.

The force required to release the attachment mechanisms 204, 206 may also be adjusted in other manners. For example, a distance 296 to which the bayonets 238 of the second attachment mechanism 206 radially extend from a base 298 of the second attachment mechanism 204 may be adjusted. In this regard, increasing the distance 296 may increase the force required to separate the attachment mechanisms 204, 206 without rotation, whereas decreasing the distance may decrease the force required to separate the attachment mechanisms without rotation.

Additionally, the force required to separate the attachment mechanisms 204, 206 without rotation may be adjusted by changing a stiffness of the compliance member 210. In this regard, a softer material may decrease the force required to separate the attachment mechanisms 204, 206 without rotation. Conversely a harder material may increase the force required to separate the attachment mechanisms 204, 206 without rotation. Adjustment of the stiffness of the compliance member 210 may also affect the torque required to secure and release the attachment mechanisms 204, 206 via rotation in the same manner. In this regard, a stiffer compliance member 210 may require more torque for rotational attachment and release, and a softer compliance member may require less torque for rotational attachment and release.

Embodiments of related methods are also provided. As illustrated in FIG. 15, a method may include positioning a plurality of bayonets in a radial configuration with an aperture defined therebetween in a cavity defined by a body at operation 300. Further, the method may include positioning at least one compliance member between the bayonets and the body to bias the bayonets toward one another at operation 302. The method may also include restraining rotational movement of the bayonets with respect to the body with a plurality of alignment members configured to allow for radial movement of the bayonets at operation 304.

In some embodiments positioning the compliance member between the bayonets and the body at operation 302 may comprise aligning a plurality of recesses defined in the compliance member with the alignment members. Further, restraining rotational movement of the bayonets at operation 304 may comprise aligning a plurality of recesses defined in the bayonets with the alignment members. The method may further comprise inserting a lens into the body. Also, the method may include inserting one or more sliding inserts between the lens and the bayonets.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An attachment mechanism, comprising:
a body defining a cavity therein;
a plurality of bayonets received in the cavity and radially disposed around an aperture;
at least one compliance member positioned between the bayonets and the body and configured to bias the bayonets toward one another; and
a plurality of alignment members configured to allow radial movement of the bayonets and restrain rotational movement of the bayonets relative to the body.

2. The attachment mechanism of claim 1, wherein the alignment members are defined by the body.

3. The attachment mechanism of claim 1, wherein the compliance member comprises an elastomeric ring.

4. The attachment mechanism of claim 3, wherein the elastomeric ring defines a plurality of recesses and the alignment members extend through the recesses.

5. The attachment mechanism of claim 1, wherein the bayonets comprise a plurality of recesses and the alignment members extend through the recesses.

6. A lens device, comprising:
a body defining a cavity therein;
a lens received in the cavity;
a plurality of bayonets received in the cavity and radially disposed around an aperture;
at least one compliance member positioned between the bayonets and the body and configured to bias the bayonets toward one another; and
a plurality of alignment members configured to allow radial movement of the bayonets and restrain rotational movement of the bayonets relative to the body.

7. The lens device of claim 6, wherein the body comprises an end wall defining a through hole aligned with the aperture.

8. The lens device of claim 7, wherein the bayonets and the compliance member are sandwiched between the lens and the end wall.

9. The lens device of claim 8, further comprising one or more sliding inserts positioned between the lens and the bayonets.

10. The lens device of claim 7, further comprising a sliding ring coupled to an outer surface of the end wall.

11. The lens device of claim 6, wherein the body defines an internal threaded surface and the lens defines an external threaded surface that engages the internal threaded surface of the body.

12. The lens device of claim 11, wherein a shoulder of the body engages a shoulder of the lens.

13. A system, comprising:
an electronic device;
an accessory device;
a first attachment mechanism comprising:
    a body defining a cavity therein;
    a second plurality of bayonets received in the cavity and radially disposed around an aperture;
    at least one compliance member positioned between the second plurality of bayonets and the body and configured to bias the second plurality of bayonets toward one another;
    a plurality of alignment members configured to allow radial movement of the second plurality of bayonets and restrain rotational movement of the second plurality of bayonets relative to the body; and
a second attachment mechanism comprising a base with a first plurality of bayonets extending therefrom and with a hole extending therethrough,
wherein the first attachment mechanism and the second attachment mechanism are respectively coupled to one of the electronic device and the accessory device and the first plurality of bayonets are configured to engage the second plurality of bayonets to releasably couple the accessory device to the electronic device.

14. The system of claim 13, wherein the first attachment mechanism is coupled to the accessory device and the second attachment mechanism is coupled to the electronic device.

15. The system of claim 13, wherein the electronic device comprises a camera, and the accessory device comprises a lens.

16. The system of claim 13, wherein the accessory device further comprises a sliding ring configured to engage an exterior surface of the electronic device.

17. A method, comprising:
positioning a plurality of bayonets in a radial configuration with an aperture defined therebetween in a cavity defined by a body;
positioning at least one compliance member between the bayonets and the body to bias the bayonets toward one another; and
restraining rotational movement of the bayonets with respect to the body with a plurality of alignment members configured to allow for radial movement of the bayonets.

18. The method of claim 17, wherein positioning the compliance member between the bayonets and the body comprises aligning a plurality of recesses defined in the compliance member with the alignment members.

19. The method of claim 18, wherein restraining rotational movement of the bayonets comprises aligning a plurality of recesses defined in the bayonets with the alignment members.

20. The method of claim 18, further comprising inserting a lens into the body.

21. The method of claim 20, further comprising inserting one or more sliding inserts between the lens and the bayonets.

* * * * *